United States Patent [19]

Bordine

[11] 4,107,875
[45] Aug. 22, 1978

[54] GREENHOUSE EQUIPMENT

[76] Inventor: Darrell E. Bordine, 1835 S. Rochester Rd., Rochester, Mich. 48063

[21] Appl. No.: 763,057

[22] Filed: Jan. 27, 1977

[51] Int. Cl.² .............................................. A01G 31/00
[52] U.S. Cl. ............................................ 47/62; 47/18
[58] Field of Search ................... 47/59, 62, 60, 79, 17, 47/18

[56] References Cited

U.S. PATENT DOCUMENTS

| | | | |
|---|---|---|---|
| 2,060,735 | 11/1936 | Krueger | 47/62 |
| 2,062,755 | 12/1936 | Lyons et al. | 47/62 |
| 2,150,257 | 3/1939 | Winandy | 47/18 |
| 2,486,512 | 11/1949 | Armstrong | 47/62 |
| 2,747,331 | 5/1956 | Steiner | 47/62 |
| 2,880,549 | 4/1959 | Knipe | 47/62 |
| 3,131,064 | 4/1964 | Malchair | 47/62 |
| 3,550,319 | 12/1970 | Gaines, Jr. | 47/79 |
| 3,807,088 | 4/1974 | Jones | 47/62 |
| 3,925,926 | 12/1975 | Shigeo | 47/62 |
| 3,992,809 | 11/1976 | Chew | 47/62 |

*Primary Examiner*—E. H. Eickholt
*Attorney, Agent, or Firm*—McGlynn and Milton

[57] ABSTRACT

An assembly for supplying a nutrient solution, such as water, to plants supported on a greenhouse bench, which retains the solution supplied thereto from a reservoir disposed immediately beneath the bench. A main source of liquid, such as water, is supplied through a main valve to a float-operated valve within the reservoir for maintaining a predetermined level of the solution within the reservoir. Also included is a fluid line interconnecting the bench and a pump disposed within the reservoir whereby the solution may be pumped to the bench through a check valve in the line and which prevents reverse flow. Also attached to the line is a solenoid actuated drain valve which drains the solution from the flooded bench and back into the reservoir. A control timer controls the operation of the main valve and the pump and the solenoid actuated valve to close the main valve and, thereafter, actuate the pump for pumping the solution from the reservoir to the bench for a predetermined period of time after which the solenoid valve is opened to drain the bench back into the reservoir whereupon the main valve is opened allowing the reservoir to be replenished through the float-operated valve. A reservoir is associated with each bench and a plurality of reservoirs are supplied liquid from the main valve whereby the solution in each reservoir bench combination or pair is isolated from the solution of every other reservoir bench combination or pair.

9 Claims, 4 Drawing Figures

GREENHOUSE EQUIPMENT

This invention relates to an assembly for supplying a nutrient solution, such as water or water having a solvent therein, to plants for nourishing the plants. Particularly, the subject invention relates to greenhouse equipment for growing plants commercially. Typically, plants are planted in soil spread over a greenhouse bench or, alternatively, are planted in pots which are, in turn, supported upon a greenhouse bench. Typically, the growing plants, as distinguished from seedlings, are planted in pots which are, in turn, supported on the greenhouse bench.

Potted plants supported on greenhouse benches must be supplied water or other nutrient solutions on a periodic basis to support their growth. One of the basic methods of supply is merely to spray the plants on the bench, such as from a hose. Because the plants are in pots supported on the bench, only a small percentage of the sprayed liquid or solvent actually reaches the plants and the rest falls outside the pots and runs off as waste. Additionally, the plants are usually sprayed manually which requires expensive manpower. Some recirculating systems have been utilized where the solvent sprayed on the plants on the bench is returned from the bench to a reservoir common to a plurality of benches. A major disadvantage of these systems is that contaminants or pathogens from the plants on one bench may be transferred to another bench when the solvents are drained from the benches and mixed in the reservoir, from which they are reused. These recirculating systems are also usually manually operated and are, therefore, subject to human error. An example of such a prior art assembly, wherein a common reservoir supplies a plurality of benches, is shown in U.S. Pat. No. 2,060,735 to Krueger granted Nov. 10, 1936.

In accordance with the subject invention there is provided an improved assembly for supplying a nutrient solution to plants supported on one or more plant supporting benches from a reservoir associated with each bench with each reservoir served by a main source of solution and control means for automatically controlling the flow of solution to each reservoir and for periodically affecting the flow of solution from the reservoir to its associated bench to flood the bench and to drain each bench to its associated reservoir.

Other advantages of the present invention will be readily appreciated as the same becomes better understood by reference to the following detailed description when considered in connection with the accompanying drawings wherein.

Figure 1:
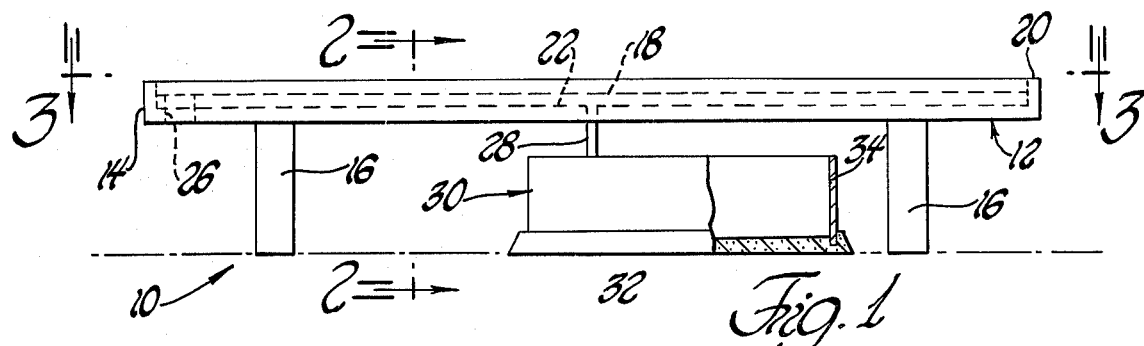
FIG. 1 is a side elevational view partially broken away and in cross section of a greenhouse bench and its associated reservoir constructed in accordance with the subject invention.

Referring now to the drawings, an assembly for supplying nutrient solution to plants and serving as greenhouse equipment is generally shown at 10.

Figure 2:
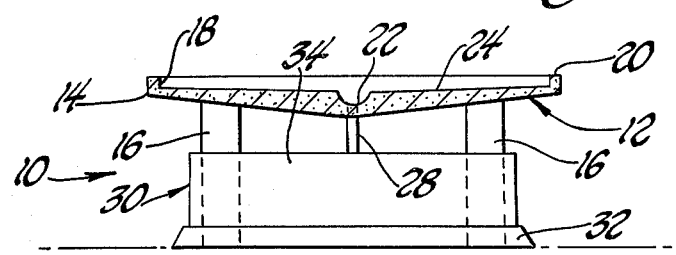
FIG. 2 is a view taken substantially along line 2—2 of FIG. 1.
Figure 3:
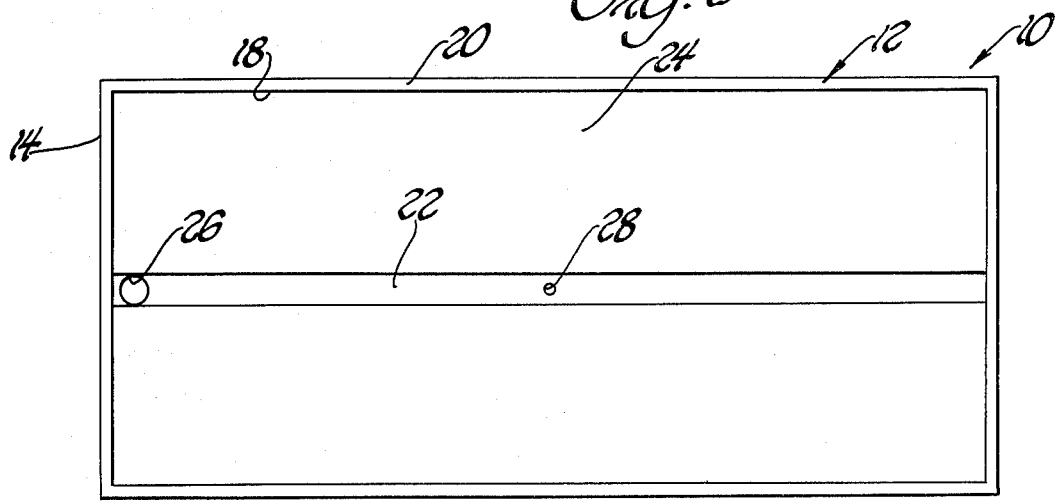
FIG. 3 is a plan view taken substantially along line 3—3 of FIG. 1.

The assembly 10 includes a greenhouse bench, generally indicated at 12, for supporting plants and retaining the nutrient solution, or a liquid such as water, for nourishing the plants. The bench 12 includes a table top 14 supported upon legs 16. The number of legs 16 will depend upon the length of the bench 12. The top 14 and the legs 16 are cast of cement. The top 14 is recessed to define a recess 18 within a retaining wall 20 disposed about the periphery thereof. As best illustrated in FIG. 3, the bench is rectangular and includes a trough or groove 22 extending between the ends of the top along the longitudinal middle. Additionally, the bottom 24 of the recess 18 slopes from either of the side retaining walls 20 downwardly to the longitudinal middle as defined by the trough 22, as best viewed in FIG. 2. The trough 22 and the bottom 24 are of a consistent elevation, i.e., level or straight, from one end to the other of the table top 14. In other words, there is no slant from one end to the other of either the trough 22 or the bottom 24 of the recess 18.

There is also included a cleanout drain 26 at one end of the trough 22 whereby the recess 18 may be washed down in the direction toward the end with the cleanout drain 26 for cleaning the bench in preparation for supporting a new batch of plants thereon. The cleanout drain includes a threaded female member cast into the table and a removable threaded plug disposed therein.

Also included is a line means or fluid connection 28 in fluid communication with the trough or groove 22 through the bottom wall of the top 14.

The assembly 10 also includes reservoir means comprising the reservoir generally indicated at 30. The reservoir 30 stores the solution for supplying the bench 12. Each bench 12 has a reservoir associated therewith and the reservoir associated with each bench is disposed immediately underneath or below the bench. In other words, each reservoir 30 is paired with a bench 12. Each reservoir 30 includes a cement base 32 and a cylindrical wall 34. The cylindrical wall 34 is preferably made of a sheet of plastic material having its ends disposed in overlapping engagement and adhesively or otherwise sealed together with the bottom of the wall 34 embedded in sealing relationship with the cement base 32. As best illustrated in FIG. 2, the diameter of the reservoir 30 is larger than the distance between the legs supporting the legs of the bench transversely of the longitudinal axis thereof.

Figure 4:
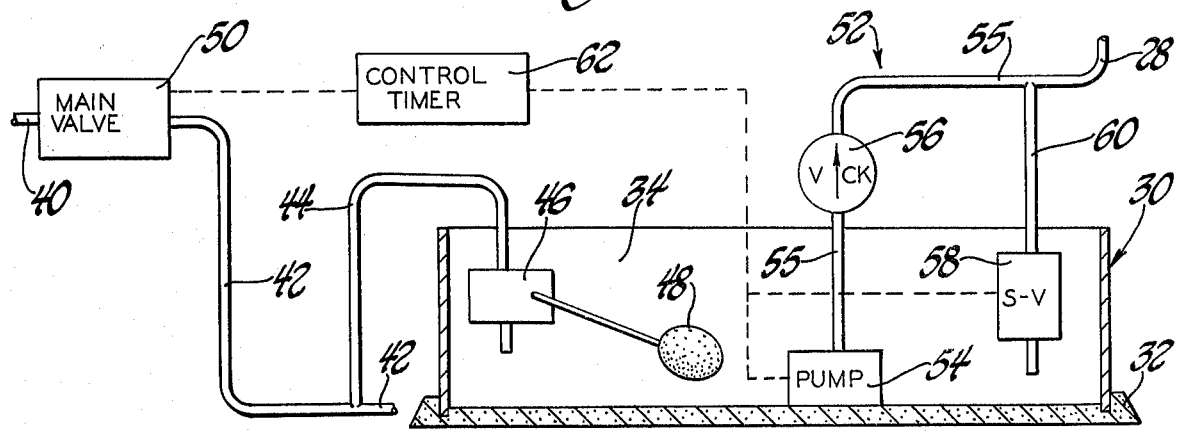
FIG. 4 is a schematic view showing the reservoir of the subject invention in association with the control means for controlling flow of nutrient solution.

The assembly also includes a source means or main source represented by the line 40 in FIG. 4 for providing a source of solution such as water which may be supplied to each reservoir 30.

FIG. 4 discloses a control means for automatically controlling the flow of solution from the source 40 to the reservoir 30 and for periodically effecting the flow of liquid solution from the reservoir 30 to the bench 12 to flood the bench and from the bench 12 to the reservoir 30 to drain the bench. The control means includes supply line means including the main conduit 42 and the reservoir conduit 44 for establishing liquid communication for the solution between the source 40 and the reservoir 30. A supply valve means comprising a float-operated valve 46 controlled by a float 48 is disposed in the conduit 44 as it extends into the reservoir 30 for controlling the flow of liquid solution through the line 44 in response to the amount of solution in the reservoir 30 to maintain a predetermined amount of solution or liquid in the reservoir 30. In other words, the float 48 moves up and down with the liquid level within the reservoir 30 and when the liquid level moves below a predetermined level the valve 46 will be opened allowing liquid to flow from the line 42 through the line 44 and into the reservoir 30 until the float 48 reaches the predetermined level to shut off the valve 46 thereby maintaining a predetermined amount of liquid level in the reservoir 30.

The control means also includes the main valve means or main valve 50 which has open and closed positions for controlling the flow of solution from the source line 40 to the supply line 42. It will be noted that the reservoir line 44 is a tributary to the main supply line 42 as the main supply line 42 supplies a plurality of supply lines 44, i.e., a plurality of reservoirs 30.

The control means also includes a flood-drain means. generally shown at 52 in FIG. 4, for flooding the bench 12 with solution from the reservoir 30 and draining the solution from the bench 12 into the reservoir 30. More specifically, the flood-drain means 52 includes a pump disposed within the reservoir 30 and submerged below the liquid level therein for supplying the solution through a line 55 and a one-way check valve 56 to the line 28 connected to the trough 22 in the bench 12. Also included in the flood-drain means 52 is a drain valve means comprising the solenoid actuated valve 58 disposed in the drain line 60 which is, in turn, connected to the line 28 upstream of the check valve 56 from the pump 54 for draining the liquid solution from the bench 12 through the line 28 and into the reservoir 30.

The control means also includes the timing means comprising the timer 62 for periodically closing the main valve 50 and actuating the flood-drain means 52 to flood the bench 12 for a predetermined period and thereafter to drain the solution from the bench 12 into the reservoir 30 and subsequently open the main valve 50. The timing means 62 comprises a 24 hour clock timer which is electrically operated and which may be set for a given time for closing the main valve 50 to prevent liquid from flowing through the supply line 42. At the same time an electrical signal will be sent to actuate the pump 54 for pumping solution from the reservoir 30 up through the line 28 to flood the bench 12. The pump will operate for a predetermined period of time sufficient for supplying an amount of solution necessary for flooding the bench. The bench will remain flooded for a selected preset or predetermined period of time. During this period liquid is prevented from draining from the bench because of the one-way check valve 56 and because the solenoid actuated valve 58 is closed. After the selected period of time for soaking the plants on the bench 12, an electrical signal is sent by the timer to the solenoid actuated valve 58 for opening the valve 58 whereby the bench is drained of solution back into the reservoir 30. The timer 62 provides a period of time for draining the bench after which the main control valve 50 is once again opened and the solenoid valve 58 is closed placing the system in its initial position whereby, in the event the solution in the reservoir 30 is not at a high enough level, the float 48 will open the valve 46 allowing solution to flow through the line 44 from the source 40 to replenish the liquid level in the reservoir 30.

As alluded to above, there is provided a plurality of reservoir-bench pairs, all supplied from a common source 40 but wherein the solution used with each reservoir-bench pair is isolated from the solution used in all other benches.

As alluded to the above, the bench employed with the subject invention is most satisfactorily utilized to support pots of plants and, accordingly, there are specific structural relationships in the bench which have been found to be very satisfactory in supplying nutrients to such potted plants. Specifically, the table top 14 has a recess 18 with a retaining wall 20 extending about the periphery of the recess 18. The trough 22 extends along the longitudinal middle of the recess 18. The table has a thickness adjacent the retaining wall 18, as it extends along the sides of the bench, which is substantially equal to the thickness of the table at the bottom of the trough 22. Specifically, the thickness of the table adjacent the side retaining walls 18 is approximately 1¾ inches (1¾ inches) and the thickness of the table immediately below the trough 22 is approximately one and three quarters inches (1¾ inches). Additionally, the amount of slope or the amount the bottom wall of the recess 18 drops from the side retaining walls 20 to the trough 22 is approximately one-quarter of the depth of the trough 22. In other words, the trough 22 is approximately four times as deep as the slope from each side retaining wall 20 to the trough 22. Specifically, the trough 22 is 1 inch deep as measured from the bottom of the recess 18 immediately adjacent the trough to the bottom of the trough and the slope on either side of the trough is one-quarter of an inch ¼ inch. Such relationships have been found to provide a sturdy bench, one which is easily cleaned and one which facilitates an accurate flooding of the potted plants on the bench as well as the draining thereof.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An assembly for supplying a nutrient solution to plants comprising: a greenhouse bench for supporting plants and retaining the solution; reservoir means for storing the solution for said bench; source means for providing a source of solution for said reservoir means; control means for automatically controlling the flow of solution from said source means to said reservoir means and for periodically effecting the flow of solution from said reservoir means to said bench to flood said bench; said control means including supply line means establishing communication for said solution between said source means and said reservoir means, supply valve means in said supply line means for controlling the flow of solution therethrough in response to the amount of solution in said reservoir means to maintain a predetermined amount of solution in said reservoir means, main valve means having open and closed positions for controlling the flow of solution from said source means to said supply line means, flood-drain means for flooding said bench with solution from said reservoir and draining solution from said bench into said reservoir, and timing means for actuating said flood-drain means to flood said bench and for closing said main valve means while said flood-drain means is actuated.

2. An assembly as set forth in claim 1 wherein said timing means periodically closes said main valve means and actuates said flood-drain means to flood said bench for a predetermined period and thereafter drains the solution from the bench into the reservoir and opens said main valve means.

3. An assembly as set forth in claim 2 wherein said flood-drain means includes a pump in said reservoir means, a check valve upstream of said pump to allow only flow out of said pump, drain valve means upstream of said check valve for draining solution from said bench into said reservoir.

4. An assembly as set forth in claim 3 including a line connecting said bench with said check valve and said drain valve means.

5. An assembly as set forth in claim 1 wherein said reservoir means is disposed immediately below said bench.

6. An assembly as set forth in claim 5 wherein said reservoir means comprises a cylindrical wall made of plastic and a cement base with the bottom of said wall embedded in said base.

7. An assembly for supplying a nutrient solution to plants comprising: a greenhouse bench for supporting plants and retaining the solution, reservoir means for storing the solution for said bench, source means for providing a source of solution for said reservoir means, control means for automatically controlling the flow of solution from said source means to said reservoir means and for periodically effecting the flow of solution from said reservoir means to said bench to flood said bench and from said bench to said reservoir means to drain said bench, said control means including supply line means establishing communication for said solution between said source means and said reservoir means, and supply valve means in said supply line means for controlling the flow of solution therethrough in response to the amount of solution in said reservoir means to maintain a predetermined amount of solution in said reservoir means, and further including a plurality of said benches, a plurality of said reservoirs with each reservoir associated with one of said benches, a supply valve means associated with each respective reservoir means for maintaining the amount of solution therein, and a supply line means associated with each said supply valve means, said main valve means allowing the flow of solution to all of said supply line means when in the open position and preventing the flow of solution to all of said supply line means when in the closed position.

8. An assembly as set forth in claim 7 wherein said control means includes flood-drain means associated with each bench and reservoir means combination for flooding each bench with solution from its associated reservoir means and draining solution from each bench into its associated reservoir means thereby isolating the solution used with each bench from the solution used with any other bench while automatically supplying all of the benches solution from a single source.

9. An assembly for supplying a nutrient solution to plants comprising: a plurality of greenhouse benches for supporting plants and retaining the solution; a plurality of reservoirs with each reservoir paired with one of said benches; source means for providing solution for said reservoirs; control means for controlling the flow of solution from said source means to each of said reservoirs and for effecting the flow of solution from each reservoir to its associated bench to flood the benches and from each bench to its associated reservoir to drain the benches so that the solution supplied to each reservoir from a single source means is isolated from the solution supplied to all other reservoirs whereby the amount of solution used is conserved and contamination from one bench does not reach another bench, said control means includes flood-drain means associated with each of said reservoirs for flooding each bench with solution from its paired reservoir and draining solution from each bench back into its paired reservoir, and means for preventing the flow of solution from said source to each reservoir during the times when its associated flood-drain means is flooding and draining the associated bench.

* * * * *